(12) United States Patent  (10) Patent No.: US 8,569,911 B2
Burchard et al.  (45) Date of Patent: Oct. 29, 2013

(54) METHOD AND SYSTEM FOR POWER MANAGEMENT

(75) Inventors: Artur Tadeusz Burchard, Eindhoven (NL); Kees Gerard Willem Goossens, Eindhoven (NL); Aleksandar Milutinovic, Eindhoven (NL); Anca Mariana Molnos, Delft (NL); Elisabeth Francisca Maria Steffens, Eindhoven (NL)

(73) Assignee: NXP, B.V., Eindhoven (NL)

( * ) Notice: Subject to any disclaimer, the term of this patent is extended or adjusted under 35 U.S.C. 154(b) by 521 days.

(21) Appl. No.: 12/936,913

(22) PCT Filed: Apr. 9, 2009

(86) PCT No.: PCT/IB2009/051509
§ 371 (c)(1),
(2), (4) Date: Oct. 8, 2010

(87) PCT Pub. No.: WO2009/125371
PCT Pub. Date: Oct. 15, 2009

(65) Prior Publication Data
US 2011/0025128 A1   Feb. 3, 2011

(30) Foreign Application Priority Data
Apr. 9, 2008 (EP) .................................... 08103464

(51) Int. Cl.
*H02J 3/14* (2006.01)

(52) U.S. Cl.
USPC ............................................................ 307/31

(58) Field of Classification Search
USPC ............................................................ 307/31
See application file for complete search history.

(56) References Cited

U.S. PATENT DOCUMENTS 6,058,491 A   5/2000   Bossen et al.
8,290,635 B2 *  10/2012   Cohen .......................... 700/295

FOREIGN PATENT DOCUMENTS

EP          1 734 436 A1   12/2006
WO       2004/086205 A1   10/2004

OTHER PUBLICATIONS

International Search Report and Written Opinion for Int'l. Patent Appln. No. PCT/IB2009/051509 (Apr. 9, 2009).

* cited by examiner

*Primary Examiner* — Robert L. Deberadinis

(57) ABSTRACT

A method and system for power management is provided. To control power supplied to a second electronic device (106), an electronic system (100) comprises a power management subsystem (110), a first electronic device (102); The power management subsystem (110) monitors the power consumed by the first electronic device (102) to control the power supplied to the second electronic device (106). A method for power management of a second electronic device (106) is provided. A power management subsystem (110) is provided.

18 Claims, 10 Drawing Sheets

METHOD AND SYSTEM FOR POWER MANAGEMENT

FIELD OF THE INVENTION

The invention relates to a power management subsystem.

The invention also relates to an electronic system comprising a second electronic device.

The invention also relates to a method for power management of a second electronic device.

BACKGROUND OF THE INVENTION

In modern electronic devices power management is becoming ever more important. For example, battery operated devices acquire more computationally intensive features, such as playing video clips. Such computationally intensive features require more power. Yet, at the same time there is a demand for longer stand-by and operating times. Also, for environmental reasons it is important not to needlessly dissipate power.

To reduce the energy use of an electronic device, such as an Integrated circuit (IC), Dynamic Power Management (DPM) is used. DPM is a technique that scales the power delivered to an electronic device to such a level that it just meets the varying performance levels required for an application using the electronic device.

The workload of an electronic device changes dynamically while the application uses the electronic device. To scale the power delivered to the electronic device the amount of power needed in the future needs to be predicted. As the future power needs of an electronic device are more accurately predicted, the more power can be saved.

One way of prediction the future power needs of an electronic device is as follows: The power consumption of an electronic device is measured. From the past measurement of the electronic device a prediction is made of the future power needs of the electronic device. One crude way to make this prediction is by predicting that the future power needs will be equal to the current power consumption. As the workload of the electronic device is changing however, the past is not necessarily a good indication of the future power needs. Consequently, a prediction based on this method can significantly under or over predict.

When an under prediction is made, and as a result too few power is supplied, the performance of the device suffers, for example, the video or audio will show hic-ups. When a more serious under prediction is made, the device dysfunctions, and a system crash is the likely result.

In case of over prediction, too much power will be supplied. Part of this power will be lost. In this case batteries of the device drain faster than necessary.

It is a problem of the prior art to accurately predict the power needs of an electronic device.

SUMMARY OF THE INVENTION

It is an object of the invention to improve the accuracy of prediction of power needs of an electronic device.

This object is especially important for battery operated devices, such as mobile phones and Personal digital assistants (PDAs).

The object is achieved by the power management subsystem according to the invention. The power management subsystem comprises a monitoring device and a power controller; the monitoring device comprises an input for receiving a power consumption signal, which represents power consumption of a first electronic device; the monitoring device is operative to process the power consumption signal to generate a power control signal; the power controller is operative to control power supplied to a second electronic device, in dependency on the power control signal.

The object is also achieved by the electronic system according to the invention. The electronic system comprises a power management subsystem according to the invention, the first electronic device and the second electronic device.

The inventors have realized that a nearly perfect prediction can be made by running an exact duplicate of the electronic device ahead of time. This idea can be exploited in various ways. For, example, some electronic devices have duplicate hardware for safety or robustness reasons. The invention can also be used with hardware that performs parallel processing.

It is a problem of the prior art that the power controlling of a second computing device can only be influenced by feedback loops from the same computing device. It is a further object of the invention to provide a system in which the power controlling of a second electronic device can also be controlled by a control signal determined with respect to a first electronic device. This is achieved by providing a monitoring device, which creates a power control signal. The monitoring device creates a power control signal, which can be representative of the power consumption signal. As the power control signal is determined on the basis of the monitoring, and as the power controller acts in response to the power control signal, the power supplied to the first electronic device can be controlled.

An electronic device includes a CMOS device, such as an Integrated circuit (IC), or an electro-mechanical device, such as a stepper motor. Examples of electronic devices also include computation or data handling devices, such as a video processing unit in a mobile phone. The power consumption signal can be a direct representation of the power consumed by the first electronic device. The power consumed by the first electronic device can also be measured indirectly, for example, through monitoring of the work load of the first electronic device. Work load is also a power consumption signal, and can, e.g., be measured, by counting how many idle operations are performed.

During operation, the second electronic device needs power. The amount of power needed by the second electronic device depends on the operation the second electronic device is doing. In normal operations the power control signal does not influence the operations performed by the second electronic device, only the amount of power that is supplied to the second electronic device.

Power control signals can also represent states in a state machine. In particular, a power control signal may signal for the states 'on' or 'off', thereby turning the second electronic device on or off.

Power can be controlled by routing the power supply through the power controller. The power controller can then throttle the amount of power supplied. The power can also be controlled by instructing other units to reduce or increase the amount of power routed to the second electronic device.

The electronic system may include a sending means for sending a power control signal from the monitoring unit to the power control unit. The sending means may be a direct connection, or a bus, or a data network, such as an intranet or the Internet.

In a practical embodiment of the invention, the power controller is arranged for controlling the frequency on a clock line connected to the second electronic device.

In a practical embodiment of the invention, the power controller is arranged for controlling the supply voltage of the second electronic device.

DPM can be implemented using dynamic voltage and frequency scaling (DVFS). Both voltage and frequency are related to the delivered power, i.e. supplied power. For example, for CMOS based digital logic, there is a linear relation between the frequency and the delivered power and a quadratic relation between voltage and delivered power. Furthermore, the performance of CMOS based digital logic is in a linear relation to its clock frequency. Frequency scaling gives a linear scaling of both performance and power.

Usually, the operating frequency, up to the maximum allowed frequency, and the supply voltage of an IC are in a relation to each other. Scaling of clock frequency implies scaling of the supply voltage level. Scaling of voltage causes quadratic scaling of the delivered power. Scaling both frequency and voltage causes third degree scaling of power.

Typically, on an IC, the frequency and the supply voltage need to satisfy Sakurai's model. To see if a frequency and supply voltage fit together use can be made of, local approximations, e.g. linear approximations, to Sakurai's model, pre-computed or pre-measured tables, or feedback loops.

By controlling the frequency supplied to the second electronic device, or by controlling the supply voltage of the second electronic device, the power delivered to the second electronic device can be controlled.

In a practical embodiment of the invention the monitoring device comprises a storage unit; wherein the storage unit is operative to store a representation of one or more values of the power consumption signal of the first electronic device.

When the monitoring device has a storage unit, the monitoring device can take into account a longer period of the past behavior of the first electronic device. This enables to more accurately detect patterns and predict the future better.

When the workload of the first electronic device changes, the representation of the power consumption signal also changes, these changes are reflected in the power consumption signal and stored in the storage unit.

The stored power consumptions signals are used by the monitor to determine a power control signal, for example, by computing an average of the power consumption signal over a first period, and by computing the average frequency and voltage that must be applied to the second electronic device for a second period. This will reduce the power consumed by the second electronic device. When power consumption signal of the first electronic device is a good predictor of the power needs of the second electronic device, the stored power consumption signal can be used directly to drive the power controller.

When the power consumption signal is indicative of the future power needs of the second electronic device, it is a problem that the current values of the power consumption signal cannot be profitably used for controlling the power supplied to the second electronic device. Using the storage, the power consumption signal can be stored, and later retrieved at a time point where the power needs of the second electronic device are accurately indicated by the power consumption signal.

Typically, the power consumption signal is an indication of the workload of the first electronic device during an interval. The power consumption signal is, e.g., the quotient of the number of productive cycles and the total number of cycles in the interval. Based on the workload and the current frequency a new frequency is chosen. For example, the new frequency is the product of the quotient and the current frequency, plus some margin. Based on the new frequency, the supply voltage is reduced to such a level that the new frequency is just maintainable. The level being chosen, for example, in accordance with Sakurai's model.

The power control signal is a representation of the power consumption signal. The storage unit may be a queue, queuing power control signals.

In one embodiment the first electronic device operates in cycles, such that in each cycle the first electronic device performs a predefined amount of work, such as, processing a predefined amount of data, wherein the storage unit can store the power consumption signal for a number of cycles. For example, the electronic system may operate using a clock. The monitoring device can store the power consumption signal for two cycles. In this way, the first stored cycle can be used to construct a power control signal, while the power consumption during a second cycle is stored. In a video application, the cycle is best so that one frame of video is processed in the cycle.

Preferably, the input to the second electronic device is delayed by one cycle. When the input is delayed for a number of cycles, possibly more than one cycle, the storage unit may need to be suitably enlarged, so that the storage unit can store a number of power consumption signals, equal to the number of cycles. It is also possible to not delay the input to the second electronic device; this is especially suitable for embodiments that perform parallel processing, and/or wherein the data processing in one cycle is related, in workload and/or power consumption, to the data processing in a previous cycle.

In a preferred embodiment of the invention, the power controller is also operative for controlling the power supplied to the first electronic device.

The monitoring device has information on the past power consumption of the first electronic device, he can use this information to control the future power supply to this device. In this way the power consumed by the first electronic device is reduced.

The monitoring device may create a second power control signal for the purpose of controlling the power supplied to the first electronic device. But, if the power consumption of the first electronic device is sufficiently close to the power consumption of the second device the power control signal may be reused. Possibly the power control signal may be processed before using the power control signal to control the first electronic device, for example, a percentage may be added to the signal. The monitoring device can use conventional DPM techniques for controlling the power supplied to the first electronic device.

In some circumstance the first electronic device can be power controlled according to the invention. In particular, this is of use in redundant processing, where the processing need to be repeated, because of an error. In one embodiment the power controller is conditionally operative for controlling the power supplied to the first electronic device.

In a practical embodiment of the invention, the monitoring device comprises at least one further input for receiving a further power consumption signal, representing further power consumption of a further electronic device; the monitoring device is operative to generate the power control signal by a processing of the power consumption signal and the further power consumption signal.

In a practical embodiment of the invention, the electronic system comprises at least one further electronic device; wherein the monitoring device is operative to further monitor a further power consumption signal, representing further power consumption of the further electronic device; the monitoring device is operative to generate the power control signal by a processing of the power consumption signal and the further power consumption signal.

An electronic system (100) comprising a power management subsystem as in Claim 4, wherein the electronic system (100) comprises the first electronic device (102), the second electronic device (106) and the further electronic device (300).

The prediction becomes more accurate when more than one signal is used for the prediction. For example, when a number of electronic devices are used for parallel processing, the first two electronic devices may be used for prediction.

The power consumption signals can be combined in a number of ways. The signals may be processed according to a statistical model. For example, the signals may be averaged, possibly using a weighted average. To the average power consumption signal, a number of standard variations may be added. This may be achieved using the following method to compute a combined power consumption signal.

A method to compute a combined power consumption signal comprises the following steps: For each time value compute the power consumption value of the combined power consumption signal. To compute the power consumption value of the combined power consumption signal at the time value, construct the set of the power consumption values at the time value of the power consumption signals. Compute the average of the set. Compute the standard deviation of the set. The power consumption value of the combined power consumption signal at the time value is equal to a multiple of the standard deviation added to the average.

As a further example, a combined signal can be produced by taking for each time point the maximum value of the values of the power consumption signals.

In a practical embodiment of the invention the power controller is also operative for controlling power supplied to an additional electronic device in dependency on the power signal.

In a practical embodiment of the invention the electronic system comprises at least one additional electronic device, wherein the power controller is also operative for controlling power supplied to an additional electronic device in dependency on the power signal.

The power control signal can be used for a plurality of devices. This reduces the power more than with one device. In one embodiment, each additional device has its own power controller.

In a preferred embodiment of the invention the power consumption signal is indicative of the power needs of the second electronic device.

If the power consumption signal is indicative of the power needs of the second electronic device the object of more accurate predications is achieved. The power consumption signal leads to an accurate power control signal, since the power consumption signal is indicative of the power needs of the second electronic device; this in turn leads to a more accurate controlling by the power controller.

A power consumption signal is indicative, for example, if the power consumption signal is correlated to the power needs of the second electronic device. If the correlation is positive, the power control signal must instruct the power controller to supply more power when the power consumption signal rises, i.e. when the first electronic device consumes more power. The power control signal must instruct the power controller to supply less power when the power consumption signal falls, i.e. when the first electronic device consumes less power.

The correlation can be negative as well. If the correlation is negative, the power control signal must instruct the power controller to supply less power when the power consumption signal rises, i.e. when the first electronic device consumes more power. The power control signal must instruct the power controller to supply more power when the power consumption signal falls, i.e. when the first electronic device consumes less power.

Preferably, a phase shifted version of the power consumption signal, i.e. shifted in time over some amount of time, is correlated to the power needs of the second electronic device. Preferably, the amount of time is substantially constant and/or predetermined. That is, preferably, the power consumption signal is indicative of the future power needs of the second electronic device;

Preferably, the correlation is significant, and the coefficient of determination is close to 1 or −1. Close must be interpreted in light of the accuracy of prediction necessary to achieve any reduction of power consumption. Note, that the correlation need not be linear.

Furthermore, one way of being indicative, is when the power consumption signal is equal, or substantially equal, to the power needs or future power needs of the second electronic device. But the indicativeness need not be this accurate.

Furthermore, one way of being indicative, is when the power consumption signal mostly rises when the power needs also rise, or will rise, and/or when the power consumption signal mostly decreases when the power needs also decrease. The power consumption signal is indicative, for example, if the workload of the first electronic device is correlated to the workload of the second electronic device.

Use of the power consumption signal can also be made if the power consumption signal is only temporarily indicative of the power needs of the second electronic device.

The power need of an electronic device, such as the second electronic device, could be established, after the fact, by running the device with full power supply and measuring the power consumed. However, this method cannot usually be used for power controlling, as the power need, needs to be known in advance. The power need of an electronic device, such as the second electronic device, depends on type of hardware of the device and the processing the device performs. The processing the device performs may be dependent on the type of processing and factors such as, but not limited to: software that may be running on the device, force that must be exerted by the device, inputs, such as data input, commands, parameters.

In a preferred embodiment of the invention the monitoring device is configured to select a monitoring schedule, wherein the first electronic device is substantially only operative during the monitoring schedule.

To reduce the power used by the first electronic device, it may be operative only when needed. For example, the invention may only be used during operations known to be particularly hard to predict with other methods. Also, the first electronic device may be operative only part of the time the second electronic device is operating; for example, in case of a video application for each second frame.

In a preferred embodiment of the invention the second electronic device is substantially identical to the first electronic device.

The prediction of the power needs of the second electronic device becomes more accurate as the second hardware is identical to the first electronic device. Electronic devices that are identical have a related power consumption profile. This is especially convenient in electronic systems, which are used for parallel data processing.

In a preferred embodiment of the invention the first electronic device (102) is operative to carry out operations during a first time interval and the second electronic device (106) is operative to carry out substantially the same operations during a second time interval; wherein the first interval starts before the second interval. In a preferred embodiment the first interval also ends before the second interval starts.

The prediction of the power needs of the second electronic device becomes more accurate when the second device performs the same action. This effect is most pronounced when the second electronic device is also substantially identical to the first electronic device.

In one embodiment, the first electronic device is substantially identical to the second electronic device, and the first electronic device operates substantially identical to the second electronic device, the input to the second electronic device is delayed over a time period, and the output of the first electronic device is delayed over the time period, wherein, when the results of the operating of the first electronic device is not equal to the results of the operating of the second electronic device, the part of the operating corresponding to the unequal results is repeated.

If the electronic devices are computational devices, operating substantially identical can be achieved by performing the same computation. Preferably the computations are divided into multiple blocks of computations, in which case substantially identical operation can be achieved by computing the same block.

If the electronic devices are data handling devices, operating substantially identical can be achieved by handling the same data. Preferably, the data handling is divided into multiple blocks of data handling, in which case substantially identical operation can be achieved by performing the same block of data handling.

This embodiment is advantageous in systems that have such a high variation in their silicon, that the result of a computation by the system can be faulty. In this case using the second electronic device to produce the same result, allows for a comparison of the results of both electronic devices. When the results differ an error is discovered. In this case the workloads of both electronic devices are identical, albeit shifted in time.

In safety critical systems, usually 3 identical electronic devices are used, such that the output of the collective of 3 electronic devices is chosen by majority voting. The first electronic device can be used to control the power supplied to the other two electronic devices. Also more than 3 devices may be used.

The first and second time period can be equal to one or more cycles of a clock. The first and second time period can be equal to the time a typical operation takes, for example, the processing of a single video screen, or the processing of a single frame of a compressed audio format, such as mp3. Typically the first and second periods of time are equal in time length.

In a preferred embodiment of the invention the first electronic device is arranged for processing input occurring at a first input, and the second electronic device is arranged for processing input occurring at a second input, and wherein the second input is connected to an input delay unit; wherein the input delay unit is operative to delay, the processing by the second electronic device, of input occurring at the second input.

During parallel processing the best correlation occurs between the current power consumption signal and the current power needs. This is caused by the fact that the data currently processed is likely to be related, at least related in the workload that they cause. To exploit this, the parallel processing needs to be separated in time. This can be achieved by delaying the input to the second electronic device.

An input delay unit can be implemented as a buffer or queue, for temporarily buffering the input for the second electronic device. An input can comprise: data, commands, parameters, instructions, etc.

In a preferred embodiment of the invention the first electronic device is arranged for processing output occurring at a first output, and the second electronic device is arranged for processing output occurring at a second output, and wherein the first output is connected to an output delay unit; wherein the output delay unit is operative to delay, the occurring at the first output by the first electronic device.

A problem when using the invention with an input delay unit is that the data outputs are not available at the same time; this can be solved by providing an output delay. The output delay, delays the output that becomes available first, so that the output that becomes available later comes at the same time.

The output delay unit is particularly convenient when the electronic system comprises a comparator, such that the comparator has access to, e.g. is connected to, the first output and the second output. The comparator compares the outputs of the first and second electronic device. If the outputs are unequal, or substantially unequal, the comparator causes the first and second electronic device to repeat all, or part, of a processing, such as a computation. If the first and second electronic devices produce a floating point number, the comparator may allow a predetermined margin between the floating point numbers before causing the repeating.

In a practical embodiment of the invention the electronic system has a pipe line configuration with multiple stages; wherein the first electronic device and the second electronic device include, respectively, a first stage of the pipe line and a second stage of the pipe line;

In a pipe line architecture the second electronic device takes an input that is an output of the first electronic device. The first and second electronic devices thus cooperate to produce an output. In one embodiment an instruction pipe line is used. In another embodiment a data pipe line is used.

Typically the first electronic unit receives an input and produces a first output. The second electronic device receives the first output and produces a second output. More than two electronic devices may be employed in the pipe line, to advantage.

The method according to the invention for power management of the second electronic device comprises the steps of: monitoring a power consumption signal, which represents power consumption of a first electronic device during a first period; processing the power consumption signal for generating a power control signal; controlling power supplied to the second electronic device during a second period, according to the power control signal.

The method achieves the object by using the power consumption signal to create a power control signal. In this way the power controlling of the second electronic device can be regulated using the power consumption of a different device, i.e. the first device.

In a preferred embodiment of the invention a mobile electronic device comprises an electronic system according to the invention. A mobile electronic device includes, but is not limited to: a mobile phone, a PDA, a laptop computer, a digital camera.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

Figure 1:
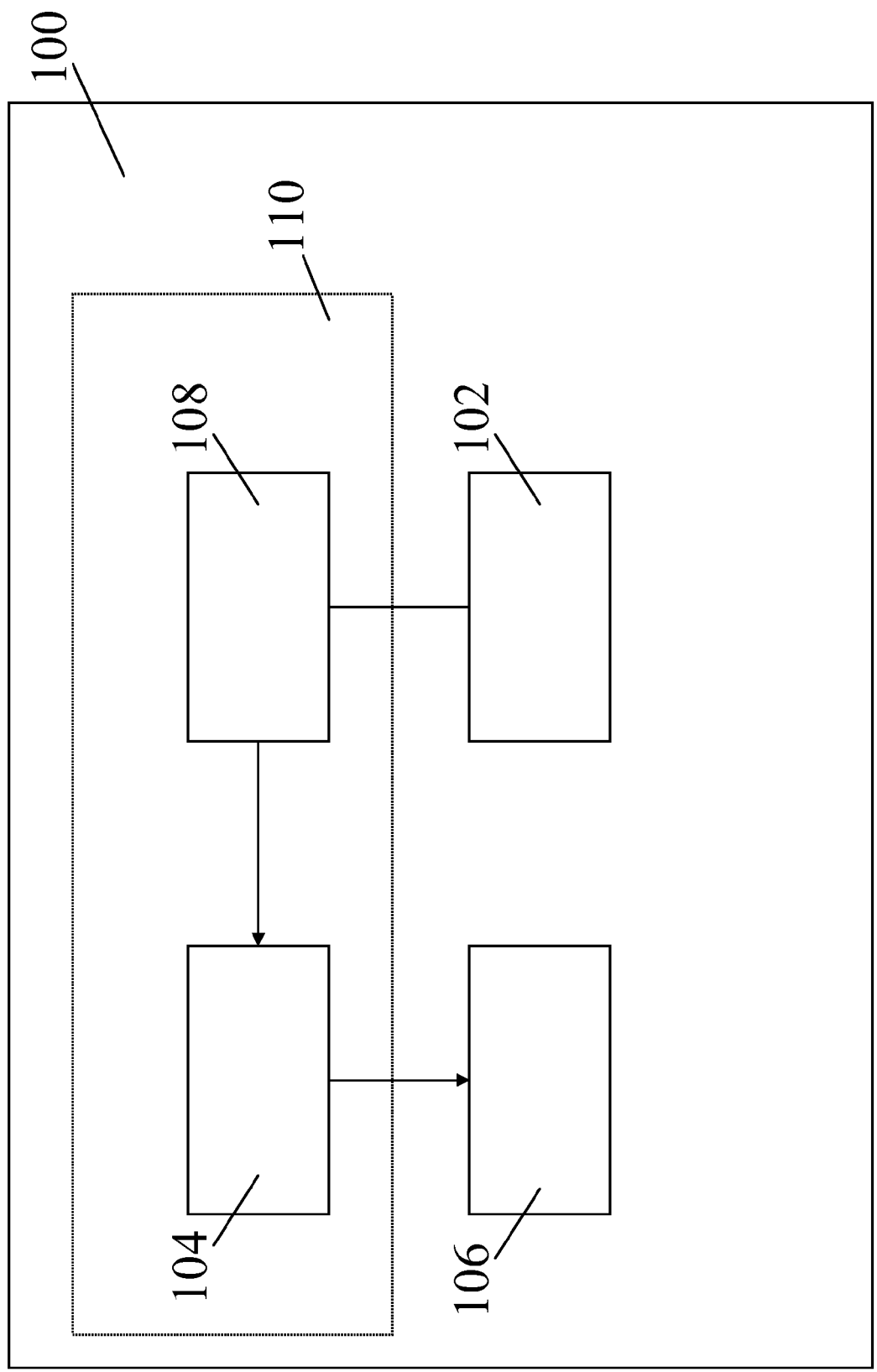
FIG. 1 is a block diagram showing an embodiment of an electronic system according to the invention.

LIST OF REFERENCE NUMERALS 100 an electronic system
102 a first electronic device
104 a power controller
106 a second electronic device
108 a monitoring device
110 a power management subsystem
200 a storage unit
300 a further electronic device
400 an additional electronic device
500 a communicative coupling
602 a second input
604 an input delay unit
606 a second output
608 a first input
610 a first output
612 an output delay unit
702 a monitoring
704 a processing
706 a controlling
802 a timeline of the first electronic device (102)
804 a timeline of the second electronic device (106)
806-816 a processing step
900 a redundant processing system without a power management subsystem
902 a redundant processing system with a power management subsystem
1000 a redundant system
1002 a clock line
1004 a clock delay unit
1006 an input line
1008 a comparator feedback line
1010 a second power controlling connection
1012 an output comparator

DETAILED DESCRIPTION OF THE EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 shows a block diagram illustrating an embodiment of an electronic system (100) according to the invention. The electronic system (100) comprises a power management subsystem (110). The power management subsystem (110) comprises a power controller (104) and a monitoring device (108). The electronic system (100) also comprises a first electronic device (102) and a second electronic device (106). The monitoring device (108) is arranged to monitor, e.g., measure and/or record, a power consumption signal of the first electronic device (102). A power consumption signal is, for example, the power consumption of the first electronic device (102). The power consumption signal may be the varying voltage drop measured across the first electronic device (102) or the varying current running through the first electronic device (102). The power consumption signal may be the workload of the first electronic device (102).

The monitoring device (108) determines a power control signal, and makes the power control signal available to the power controller, via a sending means. In this embodiment the monitoring device (108) is connected to the power controller (104). The power controller (104) is arranged to control the power supplied to the second electronic device. The power controller (104) can control the frequency of a clock, or the supply voltage itself. The monitoring device determines the power control signal on the basis of the monitoring, however, other information could also be used, such as past behavior of the system (100), in particular, past behavior of device (102).

The power controller (104) may comprise a clock generation unit (CGU) and/or a power management unit (PMU). The CGU generates a clock based on the PLL, DDS or divider method, or other suitable clock generation method. The PMU sets a supply voltage based on the Low Drop Out (LDO) Regulator, a DC/DC inductance voltage regulator, or any other suitable voltage regulator.

The sending means can be a bus, or a direct connection. The sending means can also be a memory in which the power control signal is written by the monitoring device (108) and wherein the power control signal can be read by the power controller. If the first electronic device (102) and the second electronic device (106) are at physically different places, the sending means may use a data network.

The monitoring device performs a processing on the power consumption signal. The processing can include, for example, adding a percentage to the signal or averaging the signal over a period. The processing can also include, using the power consumption signal as is, without further processing. In one embodiment, the monitoring device (108) also monitors the power consumption signal of the second electronic device (106); the power control signal is constructed on the basis of the history of both the first electronic device (102) and the second electronic device (106).

The power control signal may be in a form that directly represents the power needed, but the power control signal may also be in a form that represents the predicted work load of the second electronic device.

The power controller (104) and the monitoring device (108) can be made using dedicated hardware, such as electronic circuits that are configured to perform the controlling and monitoring, or the power controller (104) and the monitoring device (108) can be made from generic hardware controlled using software, or the power controller (104) and the monitoring device (108) may comprise a combination of dedicated hardware and generic hardware.

The electronic system (100) has the advantage that the power supplied to the second electronic device (106) can be controlled on the basis of the monitoring of the first electronic device. If the power consumption signal is indicative of the power needs of the first electronic device this provides the advantage of power consumption reduction.

Note, the monitoring device (108) and the power controller (104) may be combined into a single device. It is not essential that the monitoring device (108) constructs the power control signal, instead it is also possible that the monitoring devices forwards a measurement of the power consumption signal, also called a trace, to the power controller (104). In that case the power controller (104) contains logic to control the future power supplied to device (106).

Figure 2:
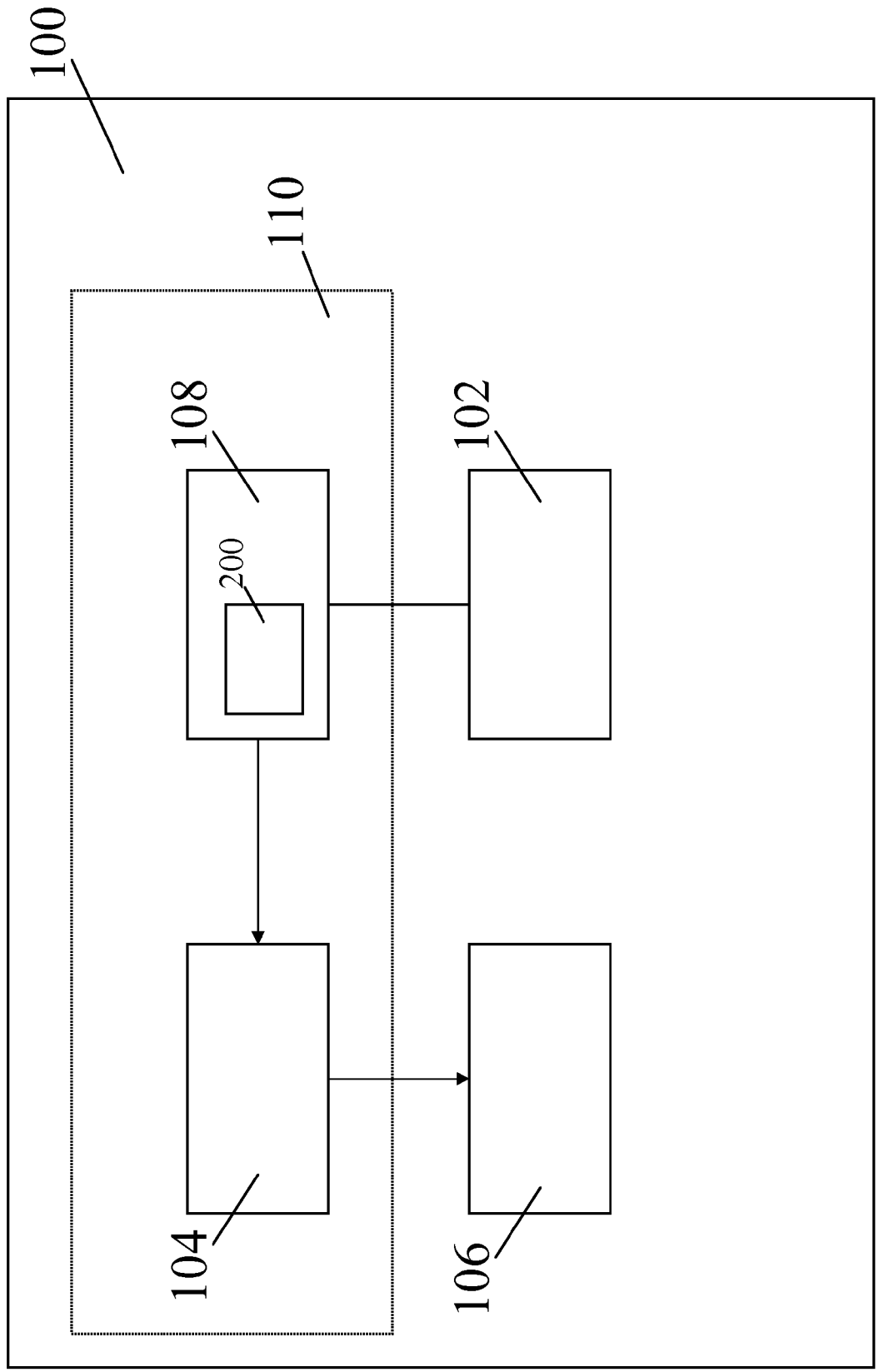
FIG. 2 is a block diagram showing an embodiment of an electronic system according to the invention.

FIG. 2 shows a block diagram illustrating an embodiment of an electronic system (100) according to the invention.

The monitoring device (108) comprises a storage unit (200). The storage unit (200) may comprise memory for the purpose of storing data. The memory can be made from regular RAM or ROM memory, such a DRAM, SRAM or SDRAM, flash memory, magnetic storage, such as a hard disk, or optical storage, or any other kind of suitable storage.

Figure 3:
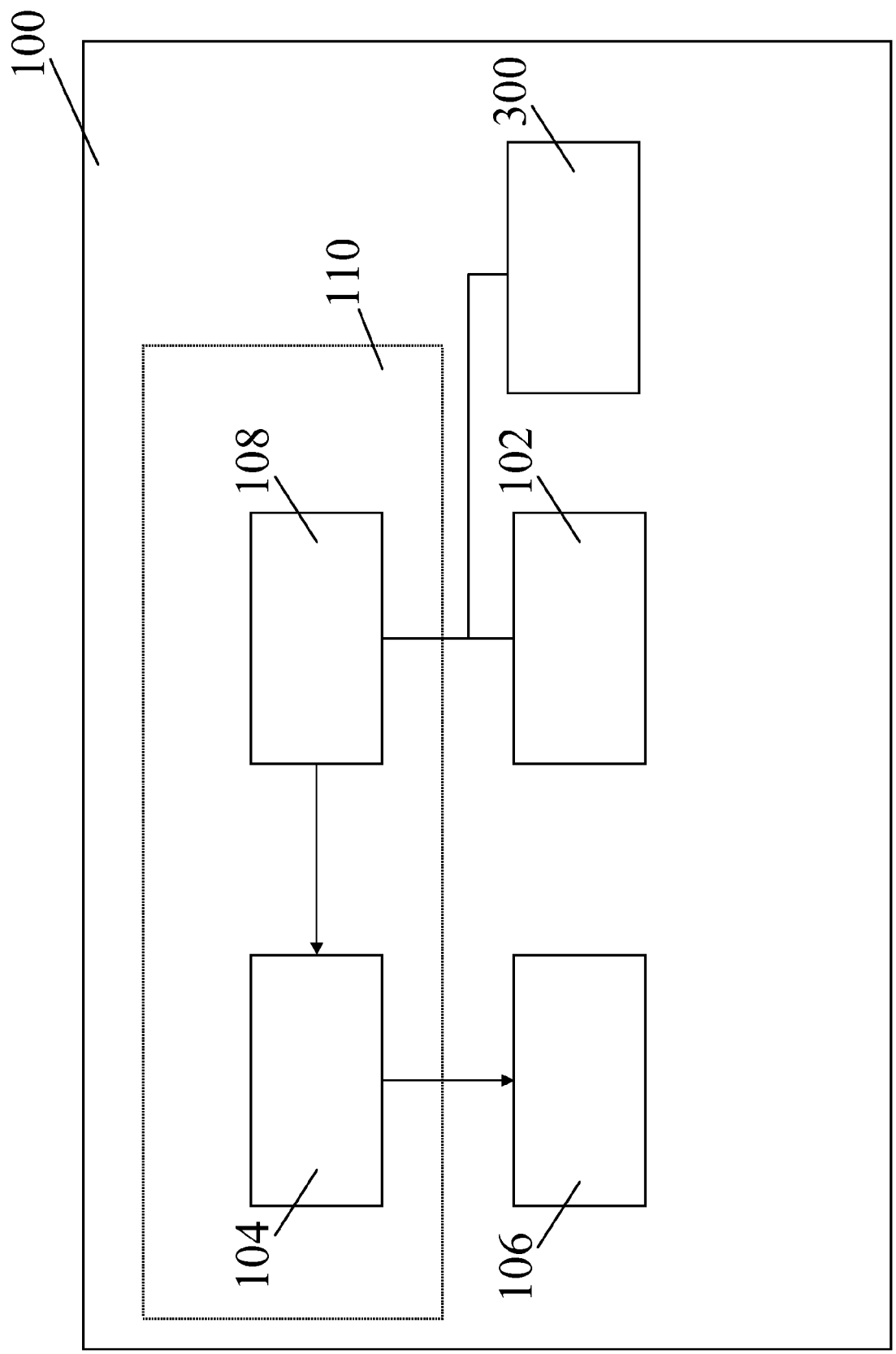
FIG. 3 is a block diagram showing an embodiment of an electronic system according to the invention.

FIG. 3 shows a block diagram illustrating an embodiment of an electronic system (100) according to the invention.

The electronic system (100) comprises a further electronic device (300). There may be more than one further electronic device (300). The power consumption of the further electronic device (300) is also monitored by the monitoring device (108). A single monitoring device (108) may be used for the further electronic device (300) and the first electronic device (102). But is may also be that each further electronic device (300) contains a monitoring means dedicated to monitoring the further electronic device (300). The monitoring device (108) may be implemented as a distributed system, distributed across further electronic devices (300), the second electronic device (106) and a separate monitoring device (108).

The monitoring device (108) constructs a power control signal on the basis of the power consumption signal, the further power consumption signal, and other suitable information. The monitoring device (108) sends the power control signal to a power controller (104).

In one embodiment, the monitoring device (108) creates a separate power control signal for the second electronic device (106) and for each further electronic devices (300). The power controller may then receive more than one, possibly contradicting power control signals. The power controller may control according to the majority of the power control signals. Alternatively, the power controller may increase the power a little bit according to each power control signal that signals for increasing power, and decrease a little bit according to each power control signal that signals for decreasing power.

Figure 4:
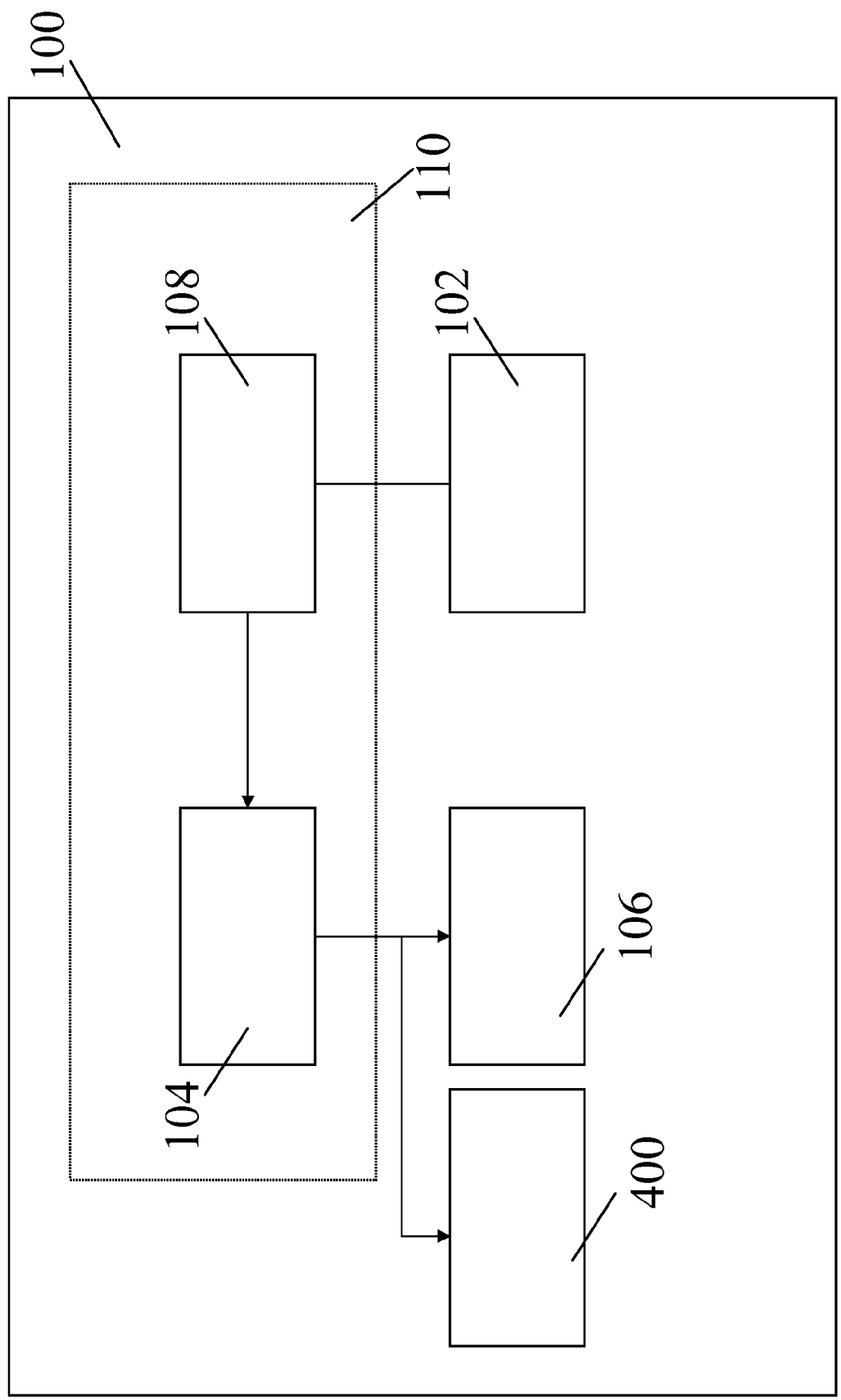
FIG. 4 is a block diagram showing an embodiment of an electronic system according to the invention.

FIG. 4 shows a block diagram illustrating an embodiment of an electronic system (100) according to the invention, wherein the power controller (104) controls the power supplied to the second electronic device (106) and to an additional electronic device (400).

The power controller (104) is connected to the power supply of both the second electronic device (106) and the additional electronic device (400).

The power controller may also control multiple additional electronic devices (400).

This embodiment may be used for redundant processing, wherein the same processing is performed more than once. This is of use for safety critical information, where a high certainty of correct operation is needed. Redundant processing may also be used for hardware that is too unreliable to use without a mechanism to detect error, for example, for high speed processors, which are running at the edge of their capabilities.

This embodiment may also be used for parallel processing. To speed up a large computation, the computation may be divided in parts. A number of the parts can be executed in parallel, by copies of the processing hardware. Parallel processing using a number of processors has the potential to speed up the processing the number of times; parallel processing also has the potential to increase the power needed the number of times. Using this invention the needed power for parallel processing can be reduced.

Figure 5:
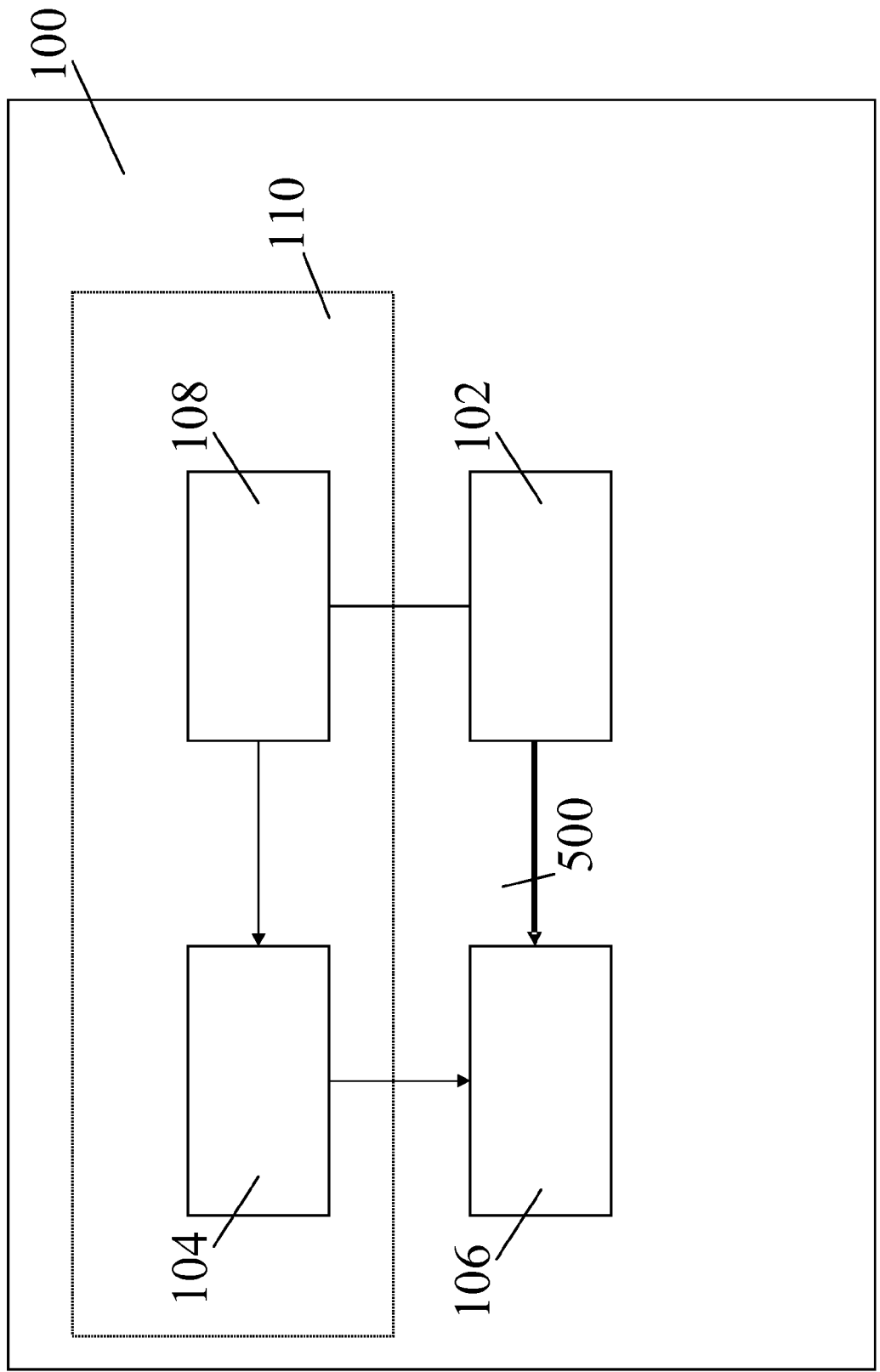
FIG. 5 is a block diagram showing an embodiment of an electronic system according to the invention.

FIG. 5 shows a block diagram illustrating an embodiment of an electronic system (100) according to the invention, wherein the second electronic device (106) takes an input from the first electronic device (102). To this end, the electronic system (100) comprises a communicative coupling (500) between the first electronic device (102) and the second electronic device (106).

The communicative coupling (500) may comprise a bus, or a direct connection, or a coupling via a register or a memory.

This embodiment is especially suited for a pipe-lined architecture. It has then as additional advantage that the power consumption of the pipe lined architecture as a whole can be reduced, based on the power consumption of part of the architecture.

Figure 6:
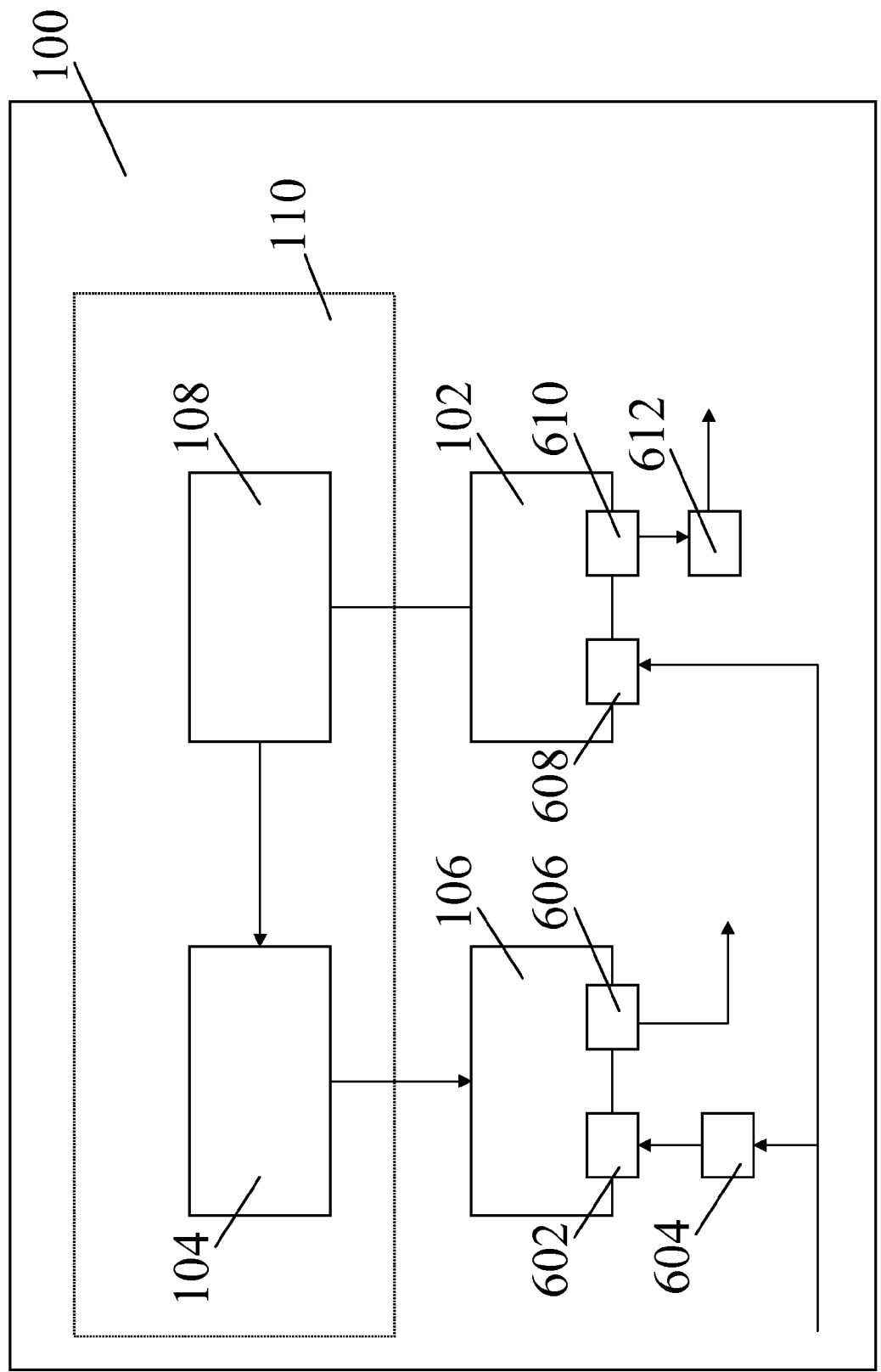
FIG. 6 is a block diagram showing an embodiment of an electronic system according to the invention.

FIG. 6 shows a block diagram illustrating an embodiment of an electronic system (100) according to the invention. The first electronic device (102) comprises a first input (608) and a first output (610). The first electronic device (102) performs a processing, such as a computation or a data handling, on inputs received at the first input (608) and produces results at the first output (610).

The second electronic device (106) comprises a second input (602) and a second output (606). The second electronic device (106) performs a processing, such as a computation or a data handling, on inputs received at the second input (602) and produces results at the second output (606).

The electronic system (100) further comprises an input delay unit (604) and an output delay unit (612). The input delay unit (604) is connected to the second input (602) and delays the processing on input received at the second input (602) by the second electronic device (106) for a certain amount of time. The output delay unit (612) is connected to the first output (610) and delays further forwarding and/or processing of the outputs of the first electronic device (102) for the certain amount of time.

The input delay unit (604) may comprise an input buffer to temporarily buffer the input. Also, the output delay unit (612) may comprise an output buffer to temporarily buffer the output.

It may be advantageous if the certain amount of time corresponds to a natural partitioning of the operation of the first electronic device (102) and/or the second electronic device (106). For example, the certain amount of time may be the amount of time needed for one or more cycles of a clock, or the processing of one or more video images. Since the electronic devices may be used for different purposes, the certain amount of time is ideally reconfigurable.

In this way, the processing of the first electronic device (102) and the second electronic device (106) is separated in time. If the first electronic device (102) and the second electronic device (106) are identical and operate identical, and they operate in a staggered manner, wherein first the first electronic device (102) operates and second the second electronic device (106), then the power consumption signal of the first electronic device can be used to control the power supplied to the second electronic device (106).

This embodiment is especially advantageous when the results occurring at the first output (606) and the second output (610) need to be compared. Using this embodiment the results can arrive for the comparison at the same time. If the results occurring at the first output (606) and the second output (610) are unequal the computations may be repeated for increased safety and/or robustness.

Note, that to achieve the advantage that the processing of the first electronic device (102) is separated in time from the processing of the second electronic device (106), the first output (610), second output (606) and the output delay unit (612) are not essential.

Figure 8:
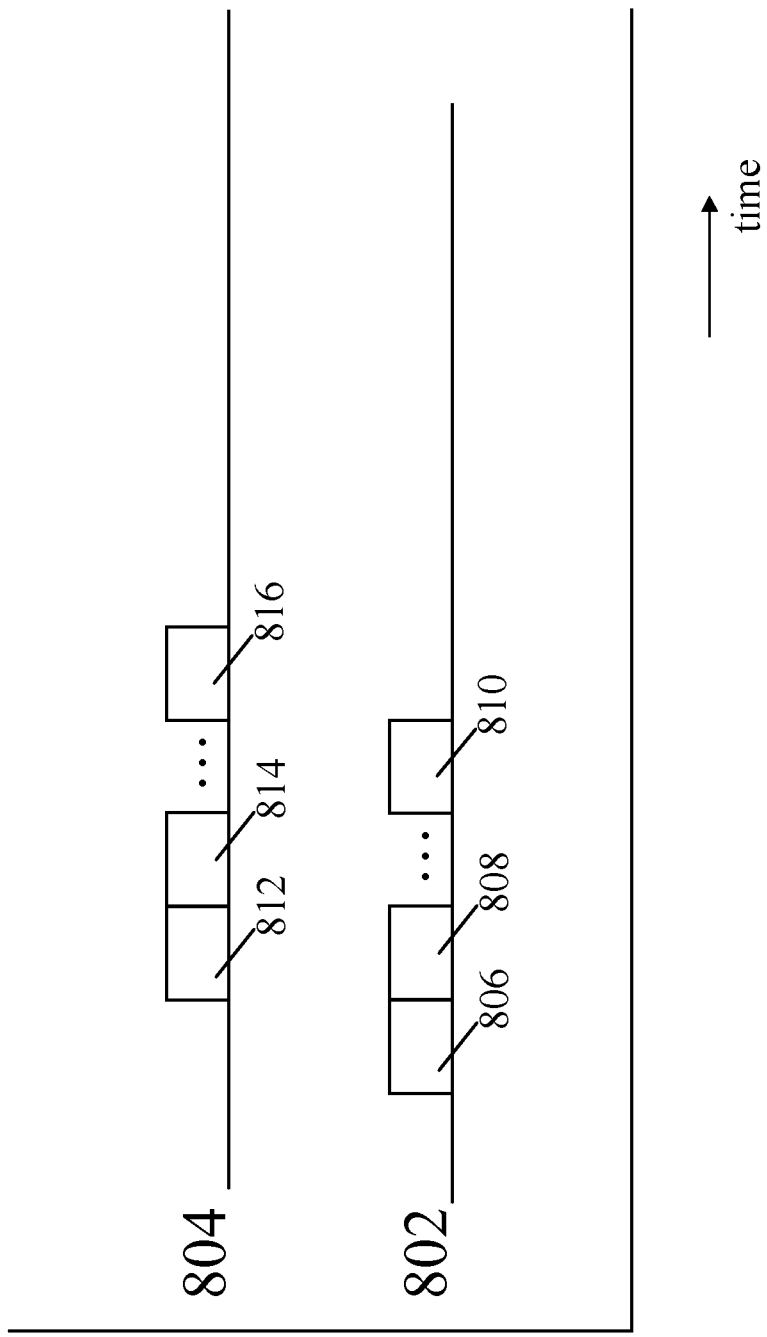
FIG. 8 is a time diagram illustrating the delay of processing in the second electronic device.

The delay is further illustrated by FIG. 8. The Figure shows a graph with a timeline of the first electronic device (802). The timeline (802) shows a number of processing steps the first electronic device (102) performs: 806, 808 and 810. The graph also shows a timeline (804) of the second electronic device (106). The timeline (804) shows a number of processing steps the second electronic device (102) performs: 812, 814 and 816. The processing of the second electronic device (106) is delayed, for example, with an input delay unit (604).

The second electronic device (106) performs the same processing as the first electronic device (102); however, the processing of the second electronic device (106) is shifted for an amount of time equal to one processing step. The processing (812) is equal to the processing (806), the processing (814) is equal to the processing (808) and the processing (816) is equal to the processing (810).

During the processing (806) the power consumption signal of the first electronic device (102) is monitored by the monitoring device (108). On the basis of the power consumption signal, the monitoring device (108) constructs the power control signal. In response to the power control signal the power supplied to the second electronic device (106) is controlled. The controlling happens during the processing (812). Since the processing (812) is equal to the processing (806) the power control signal very accurately reflects the power needs to of the processing (812).

During the processing (812), the monitoring device (108) monitors the power consumptions signal during the processing (808). On the basis of the power consumption signal during the processing (808) the power control signal for the processing (814) is constructed.

Figure 7:
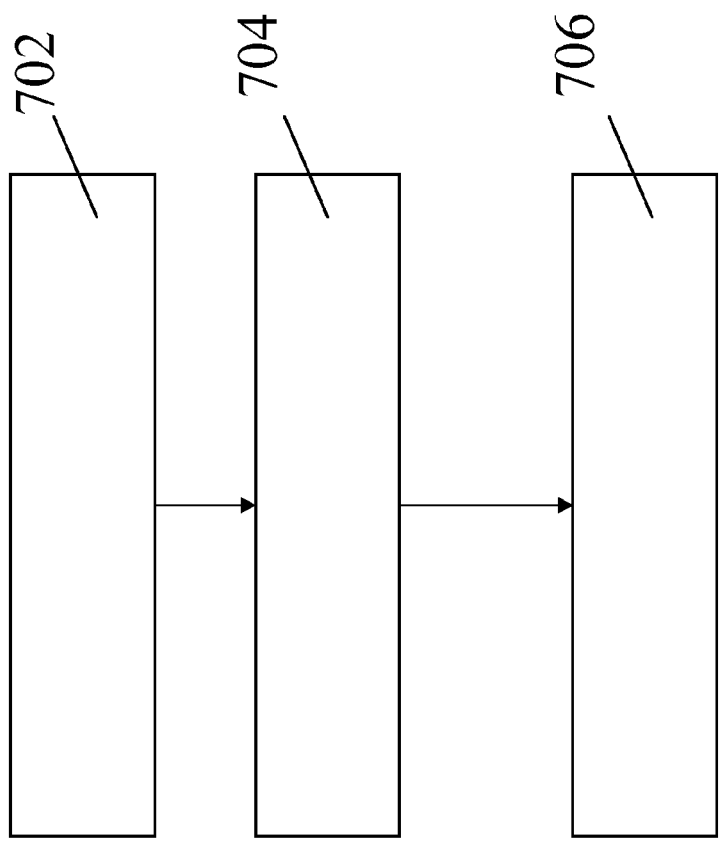
FIG. 7 is a flow chart showing an embodiment of a method for power management of a second electronic device according to the invention.

FIG. 7 is a flow chart showing an embodiment of a method for power management of a second electronic device according to the invention.

Step (702) represents a monitoring of a power consumption signal, which represents the power consumption of a first electronic device (102) during a first period; Step (704) represents a processing of the power consumption signal for generating a power control signal; Step (706) represents a controlling of the power supplied to the second electronic device (106) during a second period, according to the power control signal.

The power consumption signal may be encoded in the form of an array, stored in a memory. The power control signal may encode for the full controlling. However, the power control signal may also be abbreviated, for example, it may suffice to simply send 'up' and 'down' commands, representing a need for respectively more or less power.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

Figure 9:
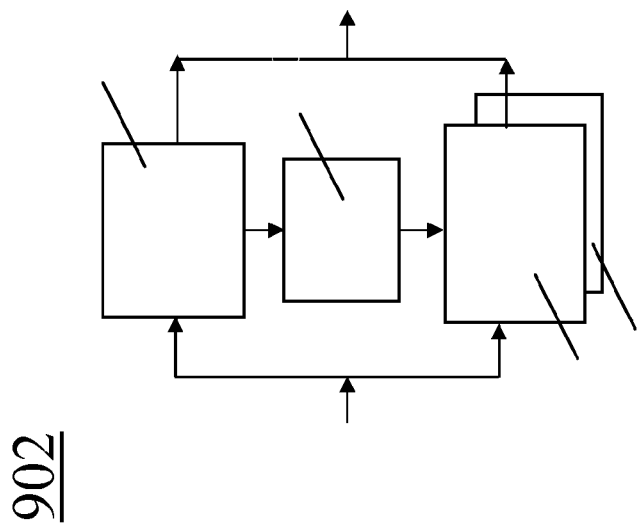
FIG. 9 is a block diagram illustrating a worked example on the reduction of energy
Figure 9:
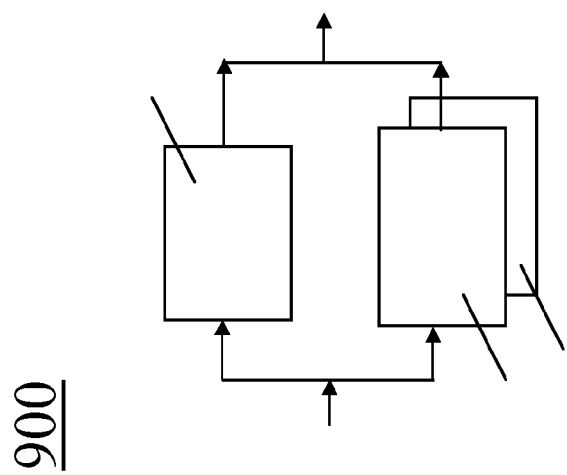

FIG. 9 is a block diagram illustrating a worked example of the reduction of energy. The block diagram shows a redundant processing system (900) without a power management subsystem and a redundant processing system (902) with a power management subsystem.

System (900) comprises a first electronic device (102), a second electronic device (106) and an additional electronic device (400). The devices (102), (106) and (400) are all connected to the same input and each produce the same output. The final output of the device is the result of a majority vote (not shown) of the outputs of the devices (102), (106) and (400). In this way, the system (900) will produce a correct result even if one of the devices (102), (106) and (400) is faulty. Instead of a majority vote also another suitable voting scheme can be used.

System (902) comprises a first electronic device (102), a second electronic device (106), an additional electronic device (400) and a power management subsystem (110). The devices (102), (106) and (400) are all connected to the same input and each produce the same output. The final output of the device is the result of a majority vote (not shown) of the outputs of the devices (102), (106) and (400). In this way, the system (900) will produce a correct result even if one of the devices (102), (106) and (400) is faulty. The input to devices (106) and (400) is delayed over a period, the output of device (102) is delayed over the period (not shown).

The power management subsystem is connected to the first electronic device for monitoring of a power consumption signal, and is connected to the second electronic device (106) and the additional electronic device (400) for controlling the power supplied.

Assume that in system (900), the devices (102), (106) and (400) each dissipate 100 mW. System (900) as a whole dissipates 300 mW.

However, in system (902), the devices (106) and (400) dissipate only 50 mW since they are under the control of the power management subsystem (110). System (902) as a whole dissipates 100+50+50=200 mW. Using the power management subsystem (110) a reduction in power consumption of 33% is achieved.

In a refinement of this example, assume that in system (900) the devices (102), (106) and (400) use conventional power reduction techniques, and that each dissipate 75 mW. System (900) as a whole dissipates 225 mW.

Assume that in system (902), to continue the refinement, that the device (102) uses conventional power reduction techniques, and dissipates 75 mW. The device (106) and (400) are under the control of the power management subsystem and dissipate each 50 mW. System (902) as a whole then dissipates 75+50+50=175 mW. Compared to the conventionally power managed version of system (900) a reduction of 22% is achieved.

When the number of additional devices (400) is larger than one, the savings that are achieved will also increase.

Some additional power is spent by the power management subsystem (110), however, the additional power will be small compared to the power needed for, say, an electronic device (102). Moreover, in a system that also uses conventional power management techniques, such as DPM, the additional power needed is smaller, as most of hardware needed for the power management subsystem (110) is already present for the conventional techniques.

Note that, although the numbers in this example are realistic, they are used merely as an example to show that the invention decreases dissipated power.

Figure 10:
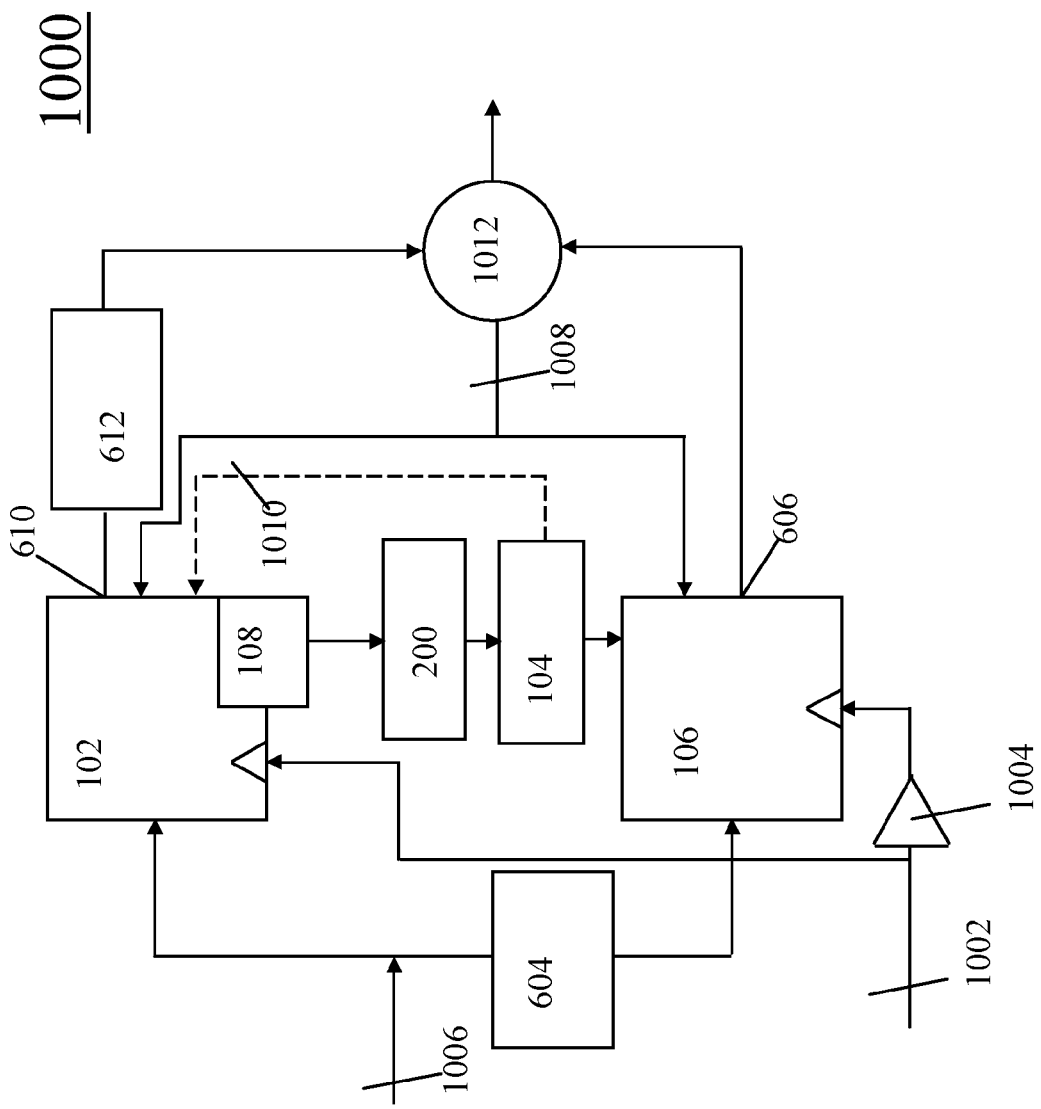
FIG. 10 is a block diagram illustrating an architecture with redundant functionality.

FIG. 10 is a block diagram illustrating a redundant system (1000). The system (1000) comprises a first electronic device (102), a second electronic device (106), a monitoring device (108), a storage unit (200), a power controller (104), an input delay unit (604), a output delay unit (612), a first output (610), a second output (606), a comparator (1012), a comparator feedback line (1008), a second power controlling connection (1010), a clock delay unit (1004), a clock line (1002), an input line (1006).

The system (1000) is a system with redundant logic used, in this particular case, for comparing the results for correctness. The devices (102) and (106) each receive the same input from an input line (1006). The result of the processing of the device (102) is sent via output (610) to comparator (1012), also the result of the processing of the device (106) is sent via output (606) to comparator (1012).

When the comparator (1012) finds that the two results are not equal, the comparator (1012) instructs the devices (102) and (106) to repeat the processing, via the comparator feedback line (1008). Device (102) and device (106) perform the same processing, on the same input, on identical hardware. Device (102) and device (106) comprise a buffer for storing the input data, in order to accommodate repeated computation (not shown).

To ensure that device (106) performs his processing after device (106) performs his processing, the device (106) is connected to the input line via an input delay unit (604). To ensure that the results of the processing of device (102) and device (106) arrive at the comparator (1012) at the same time, the output (610) is sent to the comparator (1012) via an output delay unit (612).

In this embodiment, device (102) and device (106) operate in a clocked fashion. Device (102) and device (106) are connected to a clock line (1002). Device (106) is connected to the clock line via a clock delay (1004). The simultaneous computations are represented logically by the clock line, however, the timing, can also be synchronized via the output comparison at comparator (1012). In fact device (102) and device (106) can even be completely out off sync. In that case, when both outputs are available at the comparator (1012), the devices (102) and (106) are enabled to receive a new input. The outputs then synchronize the input for each computation period. The clock line can also represents the power management period, e.g., the period of one video frame processing, rather then a hardware clock cycle synchronization.

If device (102) and device (106) operate in asynchronous fashion the clock line (1002) and clock delay (1004) are not needed.

Note that the system (1000) can also be used for software based solutions, when two identical, i.e. redundant, software tasks are used, e.g., for a software run-time correctness checking purpose.

The monitoring device (108) is used to trace the execution of device (102). Tracing is the monitoring and/or recording of a representation of the power consumption signal. Note that, the traces can be generated by the block itself, by monitors that are inserted in the block, or by external monitoring. The changes in the workload of device (102) and/or the timing of these changes are recorded into the storage unit (200). These traces are used by the power management subsystem (110) to compute an average workload for device (106) during the period, the power controller (104) does its control at. As a consequence power controller (104) can compute the average frequency and voltage that needs to be applied for that period to device (106). This will reduce the power consumed by (106) to a low level.

Because the power management subsystem uses traces of the execution of device (102), device (102) needs to execute prior to execution of device (106), this is represented, by the clock delay unit (1004), the input delay unit (604) and the output delay unit (612), that are responsible for phase shifting of the execution of devices (102) and (106) for a single power management period.

As this period can change for different executions, tasks or applications, it may be possible to change the period. As a consequence of this phase shift the storage unit (200) should be able to keep two execution traces. One execution trace is used for the current execution of device (106) and the storage space for the other execution trace is used to record the execution of device (102). There can be a delay of more than one period, in which case the storage unit (200) for storing execution traces, as well as the buffers comprised in the input delay unit (604) and the output delay unit (612) needs to be correspondingly larger.

In case the comparator (1012) discovers an error, by finding two outputs unequal the processing need to be repeated. This is signaled via the comparator feedback line (1008). At this point it is not necessary to have device (102) perform the processing before device (106) if the traces of the first execution of device (106) is kept. In order to control the power, the traces of the present execution should be kept in the storage (200) until the comparison proves correctness of data, at which point the traces can be discarded. However, when the data appears not to be correct and device (102) and (106) must repeat their computations, the power management subsystem (110) power manages both device (106) and device (102). This is possible as device (102) repeats the same processing; the stored trace can be used to control the power consumption of device (102). In the circumstance that the same computations are repeated because of an error, the power controller (104) also controls the power supplied to the first electronic device (102), via a second power controlling connection (1010). The second power controlling connection (1010) runs from the power controller (104) to the first electronic device (102). As a result the repeated operation will need less power than the original, faulty, operation.

An example of the redundant system can be two identical processors executing video decoding and synchronizing their outputs on the frame level. Here, the natural power management period is the frame period.

The system (1000) can also be adapted for use as parallel processing.

The invention claimed is:

1. A power management subsystem comprising:
a monitoring device having an input for receiving a power consumption signal, which represents power consumption of a first electronic device which performs a task resulting in an output; and
a power controller;
wherein the monitoring device is operative to process the power consumption signal to generate a power control signal; and
wherein the power controller is operative to control power supplied to a second electronic device which performs a task resulting in an output, the power supplied to the second electronic device being dependent on the power control signal;
further including a comparator connected to the first and second electronic devices for comparing the outputs of the first and second electronic devices.

2. A power management subsystem as in claim 1, wherein the monitoring device further comprises a storage unit and the storage unit is operative to store a representation of at least one value of the power consumption signal of the first electronic device.

3. A power management subsystem as in claim 1, wherein the power controller is also operative for controlling the power supplied to the first electronic device.

4. A power management subsystem as in claim 1, wherein:
the monitoring device further comprises at least one further input for receiving a further power consumption signal, representing further power consumption of a further electronic device; and
the monitoring device is operative to generate the power control signal by a processing of the power consumption signal and the further power consumption signal.

5. An electronic system comprising a power management subsystem as in claim 4, wherein the electronic system comprises the first electronic device, the second electronic device and the further electronic device.

6. A power management subsystem as in claim 1, wherein the power controller is also operative for controlling power supplied to an additional electronic device in dependency on the power signal.

7. An electronic system comprising a power management subsystem as in claim 6, wherein the electronic system comprises the first electronic device, the second electronic device and the additional electronic device.

8. An electronic system comprising a power management subsystem as in claim 1, wherein the electronic system comprises the first electronic device and the second electronic device.

9. An electronic system as claimed in claim 8, wherein the power consumption signal is indicative of a power need of the second electronic device.

10. An electronic system (100) as in claim 8, wherein the monitoring device is configured to select a monitoring schedule, wherein the first electronic device is substantially only operative during the monitoring schedule.

11. An electronic system as in claim 8, wherein the second electronic device is substantially identical to the first electronic device.

12. An electronic system as in claim 8, wherein:
the first electronic device is operative to carry out operations during a first time interval and the second electronic device is operative to carry out substantially the same operations during a second time interval;
and the first interval starts before the second interval starts.

13. An electronic system as in claim 6, wherein:
the first electronic device is arranged for processing input occurring at a first input;
the second electronic device is arranged for processing input occurring at a second input;
the second input is connected to an input delay unit;
and the input delay unit is operative to delay, the processing by the second electronic device, of input occurring at the second input.

14. An electronic system as in claim 13, wherein:
the first electronic device is arranged for processing output occurring at a first output;
the second electronic device is arranged for processing output occurring at a second output;
the first output is connected to an output delay unit;
and the output delay unit is operative to delay, the occurring at the first output by the first electronic device.

15. An electronic system as in claim 8 having a pipe-line configuration with multiple stages; wherein the first electronic device and the second electronic device include, respectively, a first stage of the pipe line and a second stage of the pipe line.

16. The subsystem of claim 1 in which the comparator is operative to instruct the first and second electronic devices to reperform their respective tasks.

17. A method for power management of a second electronic device which second electronic device performs a task resulting in an output, the method comprising the steps of:
monitoring a power consumption signal, which represents power consumption of a first electronic device which performs a task resulting in an output during a first period;
processing the power consumption signal for generating a power control signal; and
controlling power supplied to the second electronic device during a second period, according to the power control signal;
comparing the outputs of the first and second devices.

18. The method of claim 17 further including:
instructing the first and second electronic devices to reperform their respective tasks if the outputs of the first and second device are not equal.

* * * * *